United States Patent
Boutros et al.

(10) Patent No.: US 10,397,049 B2
(45) Date of Patent: *Aug. 27, 2019

(54) AUTO-PROVISIONING EDGE DEVICES IN A COMMUNICATION NETWORK USING CONTROL PLANE COMMUNICATIONS

(71) Applicant: CISCO TECHNOLOGY, INC., San Jose, CA (US)

(72) Inventors: Sami Boutros, Union City, CA (US); Rex Fernando, San Jose, CA (US); Ali Sajassi, San Ramon, CA (US); Dhananjaya Rao, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/472,964

(22) Filed: Mar. 29, 2017

(65) Prior Publication Data

US 2017/0207960 A1    Jul. 20, 2017

Related U.S. Application Data

(63) Continuation of application No. 14/805,273, filed on Jul. 21, 2015, now Pat. No. 9,634,893.

(51) Int. Cl.
*H04L 12/28* (2006.01)
*H04L 12/24* (2006.01)
*H04L 12/46* (2006.01)

(52) U.S. Cl.
CPC ...... *H04L 41/0806* (2013.01); *H04L 12/4633* (2013.01); *H04L 41/0816* (2013.01);
(Continued)

(58) Field of Classification Search
CPC ..... H04L 12/24; H04L 12/46; H04L 12/4604; H04L 12/4633; H04L 12/4641; H04L 12/5601; H04L 29/06068; H04L 29/06095; H04L 29/06163; H04L 41/04; H04L 41/0806; H04L 41/0886; H04L 41/0816;
(Continued)

(56) References Cited

U.S. PATENT DOCUMENTS 7,535,856 B2    5/2009    Booth, III
8,867,367 B2    10/2014   Allan
(Continued)

OTHER PUBLICATIONS

Pang et al, EVPN auto provisioning using a controller, Internet-Draft, 7 pages, Jun. 26, 2015.*
(Continued)

*Primary Examiner* — Frank Duong
(74) *Attorney, Agent, or Firm* — Polsinelli PC (57) ABSTRACT

In one embodiment, a network controller identifies a first sign of life for an edge device in a communication network (e.g., when the network controller receives an encapsulated workflow request for the edge device over a control plane of the communication network). The network controller further imports the encapsulated workflow request from the edge device over the control plane, determines configuration parameters for a tenant and a tenant network from the encapsulated workflow request, and transmits the configuration parameters to the edge device to provision the edge device for the tenant according to the configuration parameters.

20 Claims, 5 Drawing Sheets

(52) U.S. Cl.
CPC .......... *H04L 41/0886* (2013.01); *H04L 41/12* (2013.01); *H04L 41/5048* (2013.01); *H04L 41/5054* (2013.01)

(58) Field of Classification Search
CPC ......... H04L 41/12; H04L 45/00; H04L 45/02; H04L 45/04; H04L 45/50; H04L 49/354; H04L 49/606; H04L 2012/5617; H04L 2012/5665; H04L 2012/5667
See application file for complete search history.

(56) References Cited

U.S. PATENT DOCUMENTS

| | | | |
|---|---|---|---|
| 8,923,260 B2 * | 12/2014 | Gundavelli | H04W 8/02 370/338 |
| 2006/0187856 A1 | 8/2006 | Booth, III | |
| 2013/0297752 A1 | 11/2013 | Bhanujan | |

OTHER PUBLICATIONS

Rosen et al, Provisioning, Auto-Discovery, and Signaling in Layer 2 Virtual Private Networks (L2VPNs), RFC 6074, 32 pages, Jan. 2011.*

Aggarwal et al., "BGP MPLS Based Ethernet VPN," Internet Draft, 39 pages, Feb. 2012.

Pang et al., "EVPN Auto Provisioning Using a Controller," Internet Draft, 7 pages, Jun. 2015.

Bitar et al., "VPLS Interoperability With Provider Backbone Bridges," Internet Draft, 23 pages, Jul. 2011.

* cited by examiner

AUTO-PROVISIONING EDGE DEVICES IN A COMMUNICATION NETWORK USING CONTROL PLANE COMMUNICATIONS

RELATED APPLICATIONS

This application is a continuation of U.S. application Ser. No. 14/805,273, filed Jul. 21, 2015, which is incorporated herein by reference in its entirety.

TECHNICAL FIELD

The present disclosure relates generally to communication networks, and more particularly, to provisioning resources in the communication networks.

BACKGROUND

An ever increasing demand for cloud-based and virtualized services is rapidly changing existing network services and storage environments. For example, existing standalone storage environments are rapidly being replaced with large storage environments such as data centers, which are physically and/or logically separated from one another. However, such large storage environments present challenges to service providers such as performance requirements, latency, reliability, scalability, and the like. When cloud-based service providers fail to adequately address such challenges underlying cloud-based services to customers may suffer (e.g., outages, downtime, reduced performance, etc.).

In an effort to overcome these challenges, cloud-based service providers are increasingly employing emerging virtual technologies in these large storage environments such as data centers. For example, some of these emerging virtual technologies include Ethernet Virtual Private Network (EVPN) and Provider Backbone Bridging EVPN (PBB-EVPN), which provide Ethernet multipoint services over Multiprotocol Label Switching (MPLS) and Internet Protocol (IP) networks. EVPN leverages control-plane based Media Access Control (MAC) learning over the MPLS/IP network/infrastructure and includes features such as integrated Layer 2 (L2)/Layer 3 (L3) connectivity, native support for multihoming, MAC address mobility, network resiliency between edge devices (e.g., Provider Edge (PE) nodes), and the like. PBB-EVPN combines the functionality of EVPN with PBB (IEEE 802.1ah) in a single network node. However, despite the advantages of such emerging virtual technologies, competition within the cloud-based services industry continues to drive higher customer expectations for services and continuously presents those challenges (e.g., performance, latency, reliability, scalability, etc.) to service providers.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

According to one or more embodiments of the disclosure, a network controller identifies a first sign of life for device (e.g., a PE device) in a communication network when the network controller receives an encapsulated workflow request for the PE device over a control plane of the communication network. Notably, the encapsulated workflow request identifies a tenant and a tenant network. The network controller further imports the encapsulated workflow request from the PE device over the control plane, determines configuration parameters for the tenant and the tenant network from the encapsulated workflow request, and transmits the configuration parameters to the PE device to provision the PE device for the tenant according to the configuration parameters.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A communication network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. For example, private sub-networks such as LANs are often employed at individual sites or private environments and connect to other satellite locations via a wide area network (WAN), which is often referred to as the Internet. However, WANs are typically comprised of Internet Service Providers (ISPs), each operating an autonomous system (AS) (which may be referred to as a core network) defined by a commonly controlled interconnection adhering to a single and clearly defined routing policy. Notably, WANs such as the Internet connect disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Communication networks may be further interconnected by an intermediate network node, such as a router, to extend the effective "size" of each network.

Figure 1:
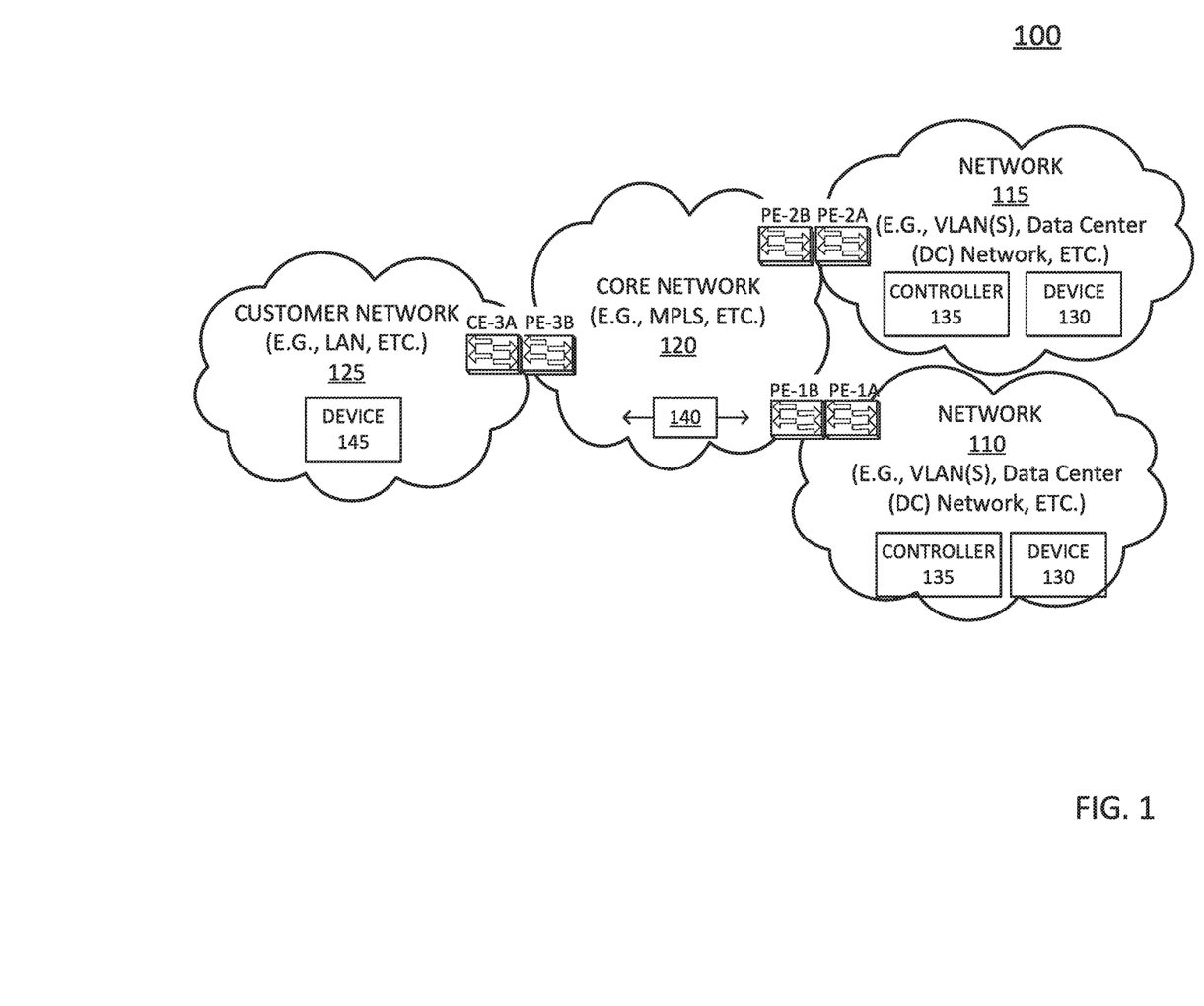
FIG. 1 is a diagram of an example communication network.

FIG. 1 is a schematic block diagram of an example communication network 100 illustratively including networks 110, 115, 120, and 125. As shown, networks 110, 115 include, for example, virtual local access networks (VLANs), network 120 includes a core network such as a multiprotocol label switching (MPLS) network, and a customer network 125 such as a local access network (LAN). Each of these networks further includes nodes/devices (e.g., routers, switches, other devices, etc.) interconnected by links and/or sub-networks. As shown, certain nodes/devices such as provider edge (PE) devices (e.g., PE-1A,B, PE-2A,B, and PE-3B) and a customer edge (CE) device (e.g., CE-3A) can communicate data such as data packets 140 between networks 110, 115, and 125 via core network 120 (e.g., between device 145, devices 130, and controllers 135 for respective networks).

Data packets 140 include traffic/messages that may be exchanged among the nodes/devices of communication network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, etc.

Notably, the PE devices and Leafs serve as a gateway for respective networks and represent a first decision point for message traffic entering the respective network. For example, the PE/Leaf devices may designate or flag individual traffic packets for particular treatment, as is appreciated by those skilled in the art.

Those skilled in the art will also understand that any number of nodes, devices, links, etc. may be used in the communication network, and that the view shown herein is for simplicity. Further, the embodiments described herein may apply to any network configuration.

Figure 2:
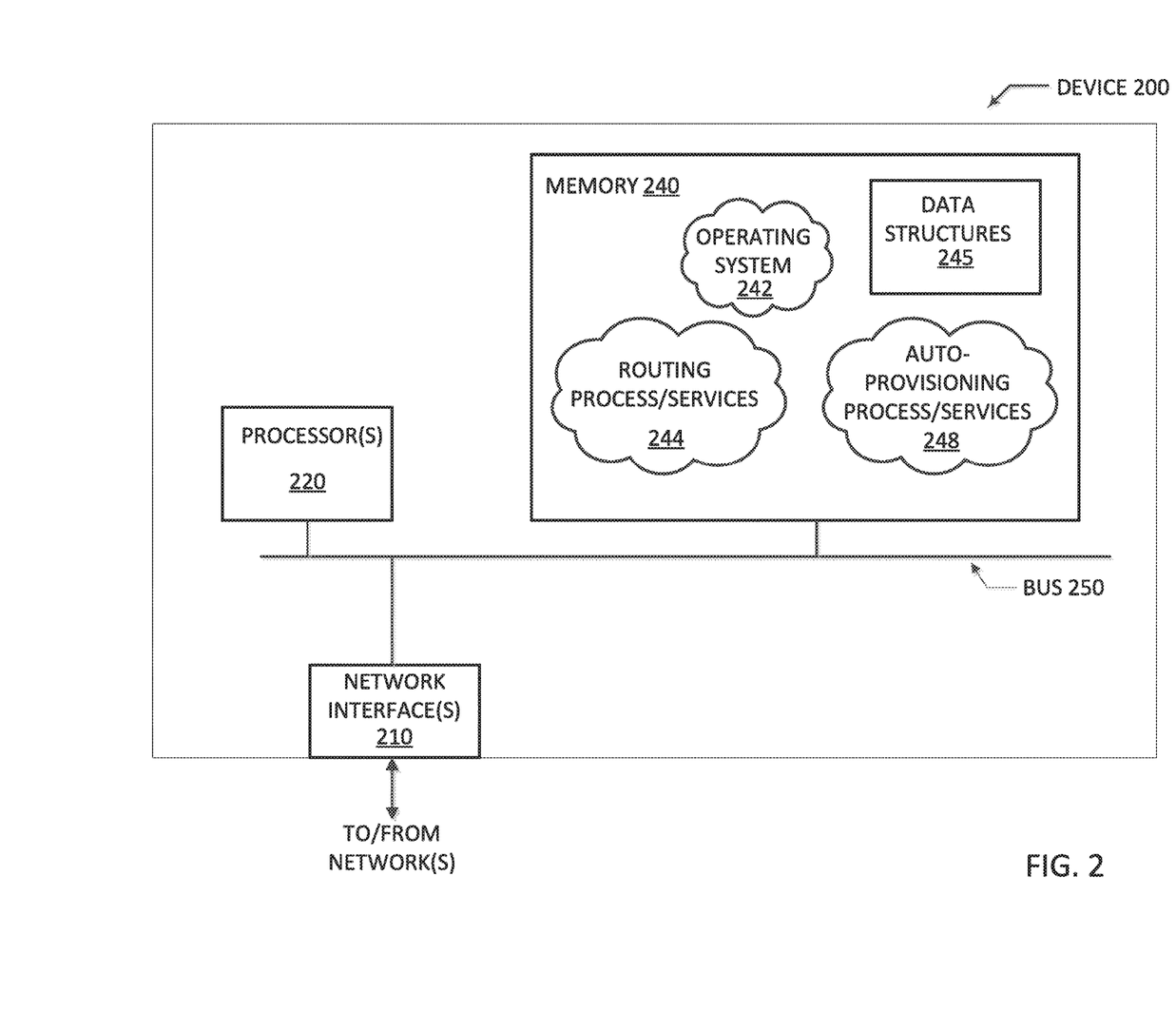
FIG. 2 is a diagram of an example network device/node.

FIG. 2 is a schematic block diagram of an example node/device 200 that may be used with one or more embodiments described herein, e.g., controllers 135, edge devices (PE device/Leafs), etc., shown in FIG. 1. Device 200 may comprise one or more network interfaces 210, one or more processors 220, and a memory 240 interconnected by a system bus 250.

Network interface(s) 210 contain the mechanical, electrical, and signaling circuitry for communicating data over links 105 coupled to the network 100. The network interfaces may be configured to transmit and/or receive data using a variety of different communication protocols. Further, network interfaces 210 may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

Memory 240 includes a plurality of storage locations that are addressable by processor(s) 220 and network interfaces 210 for storing software programs and data structures associated with the embodiments described herein. Processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an illustrative auto-provisioning process 248, as described herein.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among devices (e.g., routers) 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances, EVPN instances (EVIs), and the like, or tunneling protocols, such as for Multi-Protocol Label Switching (MPLS), generalized MPLS (GMPLS), etc., each as will be understood by those skilled in the art.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Illustratively, the techniques described herein may be performed by hardware, software, and/or firmware, such as in accordance with auto-provisioning process 248, which may contain computer executable instructions executed by the processor 220 (or independent processor of network interfaces 210) to perform functions relating to the techniques described herein, e.g., in conjunction with routing process 244. For example, the techniques herein may be treated as extensions to conventional protocols, such as an extension of Ethernet Virtual Private Networking (EVPN), Provider Backbone Bridging EVPN (PBB-EVPN) protocols, and the like, as is appreciated by those skilled in the art.

As discussed above, cloud-based service providers are increasingly employing technologies such as Ethernet Virtual Private Network (EVPN), Provider Backbone Bridging EVPN (PBB-EVPN), and the like, to provide Ethernet multipoint services to customers over Multiprotocol Label Switching (MPLS) and Internet Protocol (IP) networks.

In greater detail, E-VPN, e.g., as described in the IETF Internet Draft entitled "BGP MPLS Based Ethernet VPN" <IETF RFC 7432>, introduces a solution for multipoint L2VPN services, with advanced multi-homing capabilities, using BGP for distributing customer/client MAC address reach-ability information over the core MPLS/IP network. Also, IEEE Standard 802.1ah defines an architecture for Ethernet Provider Backbone Bridging (PBB), where MAC tunneling is employed to improve service instance and MAC address scalability in Ethernet as well as VPLS networks.

EVPN can also be used as a network virtualization overlay (NVO) solution. NVO is a virtualized solution that addresses the requirements of a multi-tenant data center. EVPN can be used as the control plane for NVO with support of various encapsulation options. An EVPN instance represents a VPN on a PE device and it can include CE devices that are connected to PE devices that form the edge of the MPLS infrastructure. The PE devices can provide virtual layer 2 bridged connectivity between the CE devices.

IETF Internet Draft entitled "PBB-EVPN" <draft-ietf-l2vpn-pbb-evpn> discusses how PBB can be combined with E-VPN in order to reduce the number of BGP MAC advertisement routes by aggregating Customer/Client MAC (C-MAC) addresses via Provider Backbone MAC address (B-MAC), provide client MAC address mobility using C-MAC aggregation and B-MAC sub-netting, confine the scope of C-MAC learning to only active flows, offer per site policies and avoid C-MAC address flushing on topology changes for All-Active multi-homing. In particular, PBB-EVPN accommodates interconnect of data centers running different technologies.

However, as discussed above, challenges remain for Service Providers (e.g., operating data centers in such large storage environments) to maintain (or even exceed) certain levels of service while also balancing performance, latency, reliability, scalability, and the like. Accordingly, the techniques disclosed herein leverage various aspects of virtual technologies to auto-provision PE/Leaf devices based on a first sign of life using control plane communications such as EVPN. In this fashion, the techniques disclosed herein reduce data plane communications, provide faster and more efficient response times to service workflow requests, and also support scalable solutions for cloud-based applications without undue complexity or cost.

Referring again to FIG. 1, assume that networks 110 and 115 represent a data center such as a centralized network and/or a repository, which may support physical and/or virtual systems (e.g., a Virtual Local Access Network (VLAN), Virtual Extensible Local Area Network (VXLAN), a Network Virtualization using Generic Routing Encapsulation (NVGRE) network, and the like. In addition, assume core network 120 is a MPLS/IP network that provides an interconnect between networks 110, 115 and customer network 125 using Ethernet Virtual Private Network (EVPN) forwarding. Further, as discussed in greater detail below, the auto-provisioning techniques disclosed herein may be employed by one or more controllers 135 (e.g., a network controller, a virtual machine manager, etc.), which operatively monitor communications from edge devices (e.g., PE-2A, PE-1A, etc.) in respective networks for a first sign of life regarding a workflow request (e.g., a request for network resources, virtual machine(s), etc.) over an EVPN control plane. For example, in response to detecting the first sign of life regarding a workflow request, controller(s) 135 may automatically configure and/or provision one or more edge device(s) to service a workflow corresponding to the workflow request over the EVPN control plane.

Figure 3:
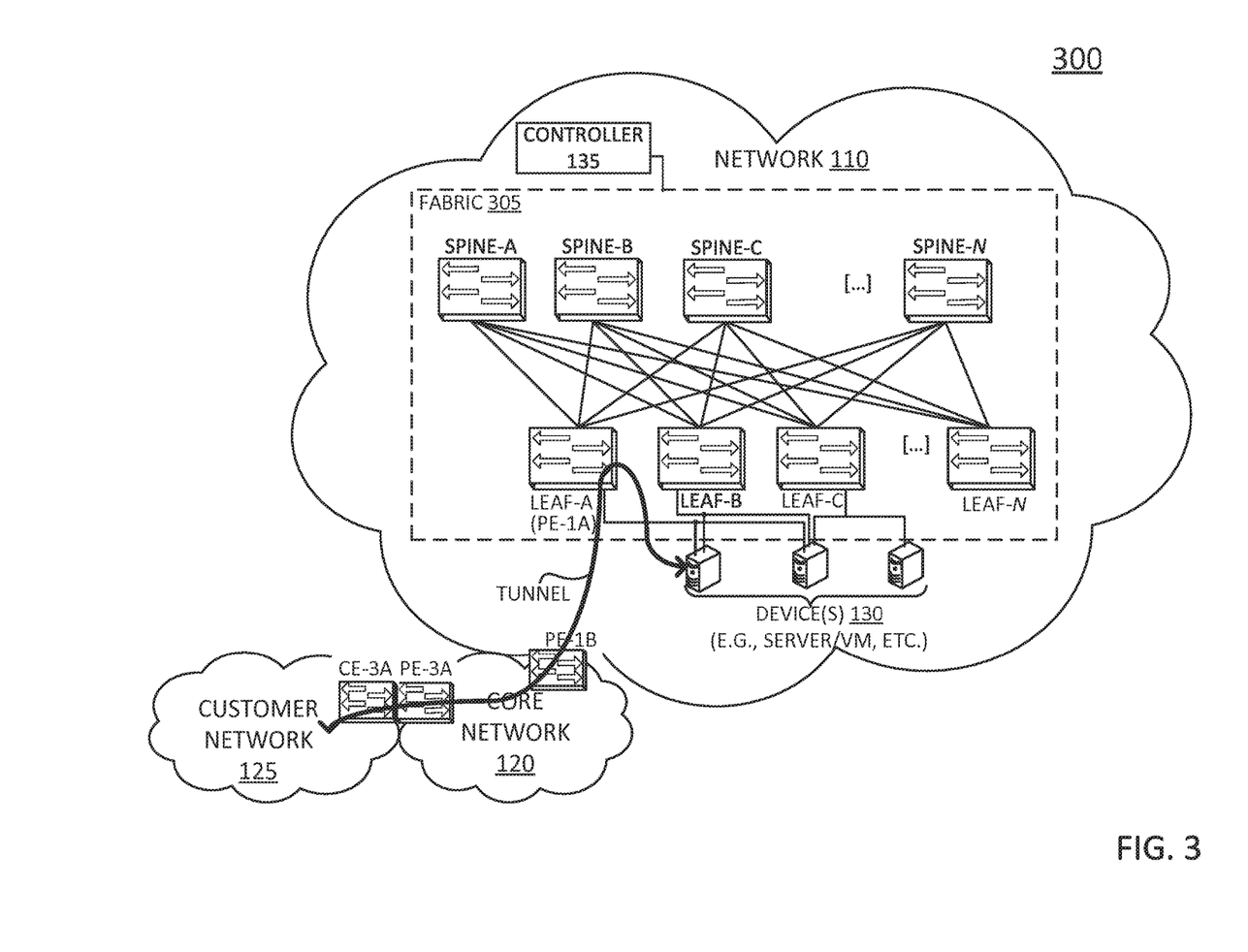
FIG. 3 is a diagram of a network architecture of a data center.

FIG. 3 provides additional context for these auto-provisioning techniques and also illustrates portions of the communication network shown in FIG. 1.

In particular, FIG. 3 provides a network architecture 300 of a data center—i.e., network 110—that supports these auto-provisioning techniques. As shown, FIG. 3 includes network 110, core network 120, and customer network 125. As discussed above, network 110 represents a data center network that may include physical and/or virtual systems. For example, as shown, network 110 includes a network fabric (e.g., fabric 305) illustrating an underlay (i.e., physical network), which supports such EVPN control plane communications.

Fabric 305 includes spine switches A-N (spine-A—spine N), and leaf switches A-N (here, leaf switch A corresponds to PE-1A). Spine switches A-N can include L3 switches and/or the spine switches may also perform L2 functionalities (e.g., supporting certain Ethernet speeds, Ethernet Interfaces, etc.). Generally, spine switches A-N are configured to lookup a locator for a received packet in its forwarding table and forward the packet accordingly. However, in some embodiments, one or more of spine switches A-N may be configured to host a proxy function that matches the endpoint address identifier to a locator mapping in a mapping database on behalf of leaf switches that do not have such mapping. For example, spine switch A can employ the proxy function to parse an encapsulated packet to identify a destination locator address of a corresponding tenant. Further, spine switch A can perform a local mapping lookup in a database to determine a correct locator address of the packet and forward the packet to the locator address without changing certain fields in the header of the packet. As shown, spine switches A-N connect to leaf switches A-N in fabric 305.

Leaf switches A-N can include access ports (or non-fabric ports) and fabric ports (not shown). Fabric ports typically provide uplinks to the spine switches, while access ports can provide connectivity for devices such as device(s) 130, servers, hosts, endpoints, VMs, or external networks to fabric 305. Leaf switches A-N further reside at an edge of fabric 305, and can thus represent a physical network edge—e.g., PE-1A. In some cases, leaf switches A-N can be top-of-rack ("ToR") switches configured according to a ToR architecture. In other cases, leaf switches A-N can be virtual switches embedded in servers, or even aggregation switches in any particular topology, such as end-of-row (EoR) or middle-of-row (MoR) topologies. Leaf switches A-N can also represent aggregation switches, for example.

Leaf switches A-N are generally responsible for routing and/or bridging tenant packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, one or more leaf switches A-N can contain virtual switching functionalities, including tunneling functionality (e.g., VPN tunneling, etc.) to support network connectivity through fabric 305 and even connect to an overlay network.

As shown, leaf switches A-N can provide devices 130 (e.g., servers, network resources, endpoints, switches, routers, processors, VMs, etc.) access to fabric 305 and, thus, connect devices 130 to external networks (e.g., core network 120, customer network 125, etc.). Here, a VPN tunnel (e.g., labeled as shown—"tunnel") provides one or more devices in customer network 125(e.g., device 145 shown in FIG. 1) access to devices 130 of network 110. Notably, each leaf switch may connect to one or more devices 130 such that a single leaf switch can connect multiple devices 130 to customer network (e.g., in response to a tenant request, etc.).

Preferably, leaf switches A-N and spine switches A-N are configured with default configuration parameters for communication in network 110. For example, in the default configuration, the leaf switches A-N and spine switches A-N may be configured to advertise specific information over the EVPN control plane and throughout fabric 305. This information can include, for example, Media Access Control/

Internet Protocol (MAC/IP) routes/addresses, trunk ports identified in a default MAC Virtual Routing and Forwarding Table (VRF), and the like.

Notably, although fabric 305 is illustrated and described herein as an example leaf-spine architecture employing switches, one of ordinary skill in the art will readily recognize that the subject technology employ any number of devices (e.g., routers, etc.), and further the subject technology can be implemented based on any network fabric, including any data center or cloud network fabric. Indeed, other architectures, designs, infrastructures, and variations are contemplated herein. Further, any number of other devices (e.g., route reflectors, etc.) can be included, or even devices as shown may be excluded, as appropriate.

In addition to spine switches A-N and leaf switches A-N, fabric 305 may also include a controller 135 that can employ the auto-provisioning techniques discussed herein (e.g., auto-provisioning process 248). As shown, controller 135 may represent a network controller, a VM manager, and other devices that may communicate over the EVPN control plane and/or the management plane.

Specifically, controller 135 is configured to communicate with one or more of the switches (i.e., spine switches A-N and/or leaf switches A-N) directly or indirectly (e.g., through route reflectors, routers, other devices, etc.) within fabric 305 over the EVPN control plane. For example, controller 135 may communicate with fabric 305 over an Ethernet Virtual Private Network-Network Layer Reachability Information (EVPN-NLRI) Route-Type 2, and the like. In this fashion, controller 135 can receive advertised or broadcast information throughout fabric 305, particularly including information for respective edge devices (e.g., leaf-A—leaf N).

Figure 4:
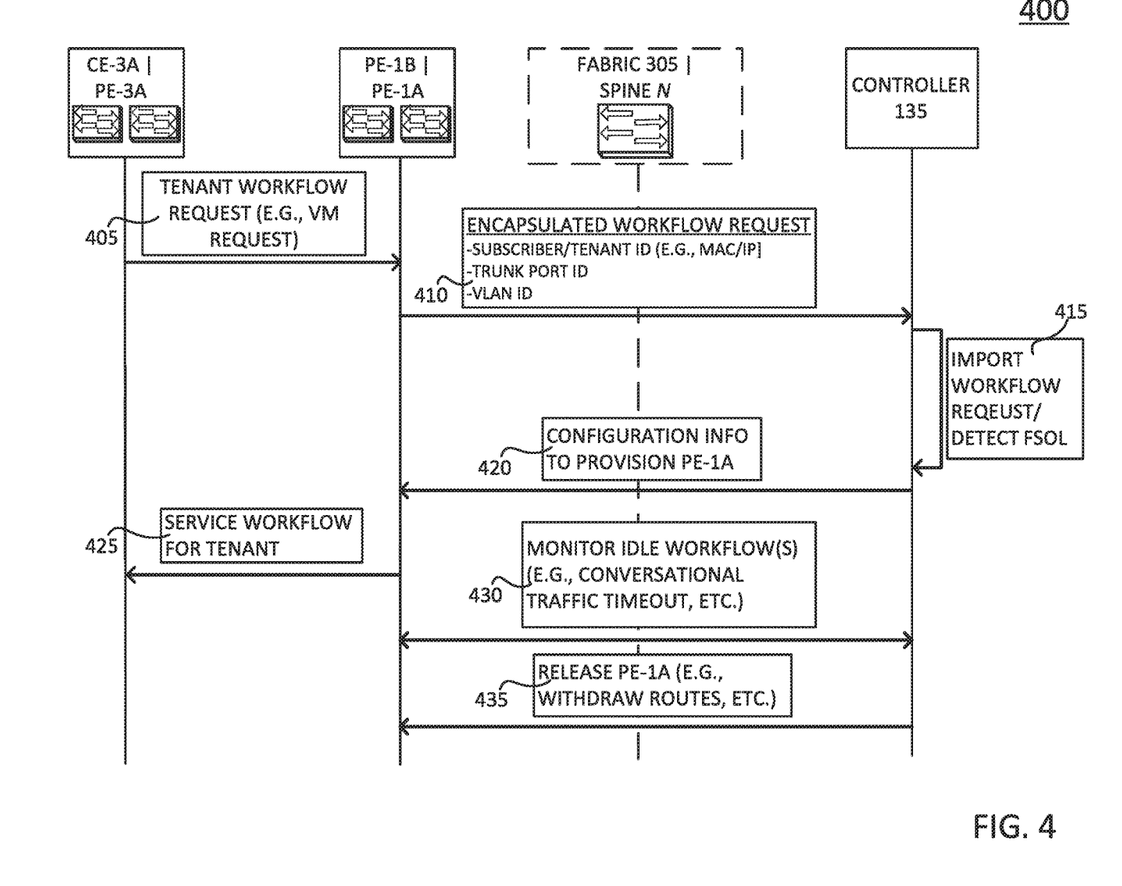
FIG. 4 is a signaling diagram, showing an auto-provisioning process employed by the architecture shown in FIG. 3.

FIG. 4 is a signaling diagram 400, particularly showing an auto-provisioning process employed in architecture 300 (ref. FIG. 3). In particular, signaling diagram 400 includes a workflow request 405 (e.g., for a tenant or subscriber) routed to a destination network/device (e.g., network 110/device 130) via edge devices—namely, CE-3A-PE3A; PE-1B-PE-1A. The workflow request is received, encapsulated, and broadcast by PE-1A, at 410, throughout fabric 305. Notably, the encapsulated workflow request can include an end-system identifier (ESI) of a RT-2, subscriber or tenant identification (ID) such as a MAC/IP address, a trunk port ID for the edge device, and a network ID (e.g., a VLAN ID/Tag, etc.). With respect to encapsulation, the leaf switch—here, PE-1A—can encapsulate the workflow using EVPN control plane in a default virtual routing and forwarding table, which is imported by the controller 135.

As discussed above, controller 135 monitors fabric 305 and may receive information broadcast throughout fabric 305. For example, at 415, controller 135 receives the encapsulated workflow request, detects a first sign of life from the encapsulated workflow, and imports the encapsulated workflow request for processing to determine configuration information/parameters for the tenant. Notably, the configuration information/parameters can include service and policy related information for the tenant. Controller 135 further transmits the configuration parameters at 420 to provision the edge device—here, PE-1A—to service a workflow corresponding to the workflow request for the tenant. For example, controller 135 may transmit the configuration parameters the edge device over a management plane (e.g., Simple Network Management Protocol (SNMP), Net-SNMP, Server Management Command Line Protocol (SM CLP), etc.). Further, in response to receiving the configuration parameters from controller 135, PE-1A updates its configuration parameters to service the workflow for the tenant at 425. Significantly, as discussed above, each leaf switch (e.g., edge device) may connect to multiple devices 130 (e.g., multiple servers, VMs, etc.). In some embodiments, controller 135 may provision multiple leaf switches or a set of leaf switches (and thus, provision multiple network resources such as devices 130) based on the encapsulated workflow request. For example, controller 135 may transmit the configuration parameters to multiple leaf switches to provision each leaf switch and corresponding devices 130 to serve the workflow request. In this fashion, the provisioning techniques described herein provide flexibility as well as scalability to quickly and efficiently respond to workflow requests with appropriate network resources.

In some embodiments, controller may optionally also monitor workflows serviced by edge devices connected to fabric 305. For example, at 430, controller monitors PE-1A for an idle workflow. If the workflow is idle for a period of time (e.g., when a tenant conversational traffic timeout occurs for a leaf switch), controller 135 may further default configuration parameters at 435 to release PE-1A. For example, controller 135 may monitors workflow traffic (e.g., conversational traffic) for a particular tenant at each edge device. Further, controller 135 may detect a traffic timeout for a given edge device and withdraw routes (e.g., EVPN control plane routes) in a default Virtual Routing and Forwarding (VRF) table from the given edge device, which may further trigger cleanup of configuration parameters from the given edge device. In some embodiments, the controller 135 may also send default configuration parameters to the edge device when all of the workflows for the particular tenant at the edge device are idle or inactive to avoid disrupting any potentially active service(s) for the tenant.

Figure 5:
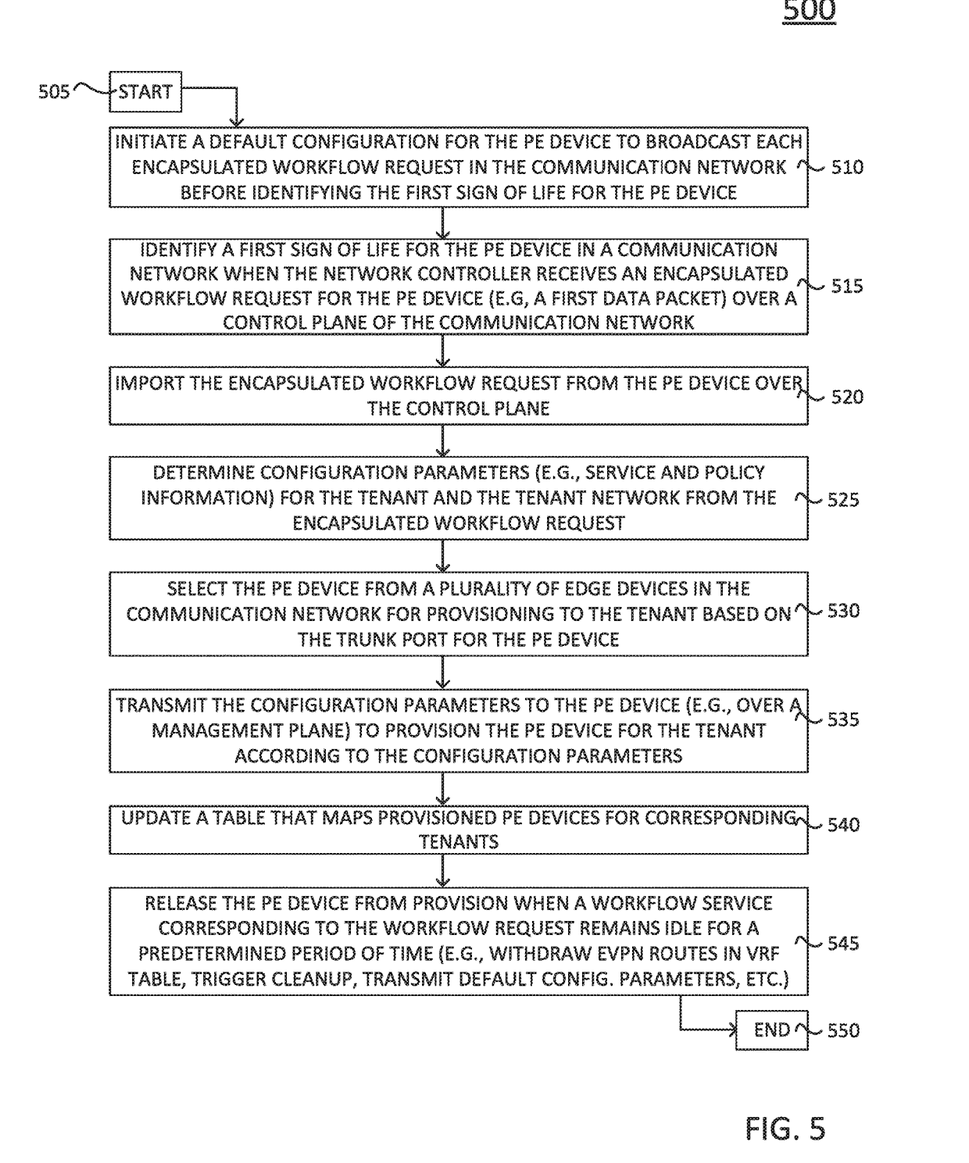
FIG. 5 is an example simplified procedure for auto-provisioning provider edge (PE) devices using control plane communications in accordance with one or more embodiments disclosed herein.

FIG. 5 is an example simplified procedure 500 for auto-provisioning edge network devices using control plane communications in accordance with one or more embodiments disclosed herein.

Procedure 500 may start 505 and continues to step 510, where, as described in greater detail above, a default configuration is initiated for the edge device to broadcast each encapsulated packet in a communication network. For example, the packets can include encapsulated workflow requests, as discussed above.

In step 515, a network controller (e.g., controller 135) may monitor traffic on a control plane (e.g., a EVPN control plane) in the communication network for data packets to identify a first sign of life for the edge device. For example, the network controller can monitor a fabric for the communication network (e.g., switches, routers, etc.) for a first data packet of a workflow request for the edge device and receive the first data packet using, for example, an Ethernet Virtual Private Network-Network Layer Reachability Information (EVPN-NLRI) Route-Type 2. Notably, as discussed above, the encapsulated workflow request identifies a tenant (e.g., subscriber identification (ID), tenant ID, etc.), a tenant network (e.g., a local access network (LAN), a virtual local access network (VLAN), etc.), a trunk port for the edge device, etc. Further, the tenant ID may include a Media Access Control/Internet Protocol (MAC/IP) address.

Procedure 500 continues to step 520 where the network controller imports the encapsulated workflow request from the edge device over the control plane, and at step 525, determines configuration parameters (e.g., service and policy information) for the tenant and the tenant network from the encapsulated workflow request. The network controller may further select the particular edge device, at 530, and provision the particular edge device to service the workflow for the tenant. For example, the edge device may be selected from a plurality of edge devices based on the trunk port of the edge device (e.g., included in the encapsulated workflow request).

The network controller further transmits the configuration parameters, at 535, to provision the edge device for the tenant (e.g., according to the configuration parameters). For example, the network controller may transmit the configuration parameters over a management plane. In some embodiments, the network controller also updates, at 540, a table that maps provisioned edge devices for corresponding tenants.

As discussed in greater detail above, the network controller may monitor provisioned edge devices for active or idle workflows and release particular edge devices when traffic for workflows is idle (e.g., conversational traffic timeout, etc.). For example, at 545, the network controller may withdraw control plane routes in a default VRF table for the edge device, which may trigger a cleanup of configuration parameters at the edge device. In other embodiments, as discussed above, the network controller may transmit default configuration parameters to the edge device to release the edge device from provision when a workflow service corresponding to the workflow request remains idle for a predetermined period of time (e.g., tenant conversational traffic timeout at the edge device). Preferably, the network controller monitors workflows for a tenant on each edge device and only releases the edge device when all workflows for the tenant are inactive to prevent service disruption.

Procedure 500 may subsequently end at step 550, or it may continue on to step 515, where, as discussed above, the network controller monitors the control plane for first sign(s) of life for edge devices in the communication network.

It should be noted that certain steps within procedures 500 may be optional, and further, the steps shown in FIG. 5 is merely an example for illustration. Certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for auto-provisioning edge devices in a communication network such as those in a data center. The auto-provisioning techniques leverage an EVPN control plane and allow a network controller to monitor (e.g., with a router/switch) data packets for a first sign of life regarding a workflow request. The network controller can further import encapsulated workflow requests over the EVPN control plane, determine configuration parameters for a tenant, and further provision edge devices based on the configuration parameters. In some instances, the network controller can also release provisioned edge devices when, for example, traffic for services corresponding to a workflow request are idle (e.g., traffic timeout). Notably, the EVPN control plane provides an overlay of Layer 2/Layer 3 services. Further, the auto-provisioning techniques may provision multiple edge devices (and thus, multiple network resources (e.g., servers, VMs, etc.)) in response to the encapsulated workflow request. In this fashion, the techniques disclosed herein leverage various aspects of virtual technologies, reduce data plane communications, support faster and more efficient response times to workflow requests, and provide scalability for cloud-based applications without undue complexity or cost.

While there have been shown and described illustrative embodiments that provide for provisioning edge devices in a communication network, it is to be understood that various other adaptations and modifications may be made within the spirit and scope of the embodiments herein. For example, the embodiments have been shown and described herein with relation to network switches and a control plane comprising the network switches. However, the embodiments in their broader sense are not as limited, and may, in fact, be used with any number of network devices (e.g., routers), and the like.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
   identifying, by a network device, an edge device in a communication network based on an encapsulated workflow request received from the edge device identifying a tenant and a tenant network;
   determining, by the network device, configuration parameters for the tenant and the tenant network from the request; and transmitting, by the network device, the configuration parameters to the edge device to provision the edge device for the tenant according to the configuration parameters.

2. The method of claim 1, wherein,
the request further identifies a trunk port for the edge device, and
the method further comprises:
selecting, by the network device, the edge device from a plurality of edge devices in the communication network for provisioning to the tenant based on the trunk port for the edge device.

3. The method of claim 1, further comprising:
updating, by the network device, a table that maps provisioned edge devices for corresponding tenants.

4. The method of claim 1, further comprising:
monitoring, by the network device, data packets exchanged between a plurality of edge switches in the communication network for identifying the edge device.

5. The method of claim 1, further comprising:
withdrawing, by the network device, control plane routes in a Virtual Routing and Forwarding table from the edge device to release the edge device from provision when traffic for a workflow service corresponding to the request is idle for a period of time.

6. The method of claim 1, wherein,
the edge device is provisioned to service a plurality of workflows for the tenant, and
the method further comprises:
transmitting, by the network device, default configuration parameters to the edge device to release the edge device from provision when traffic for each workflow service corresponding to each request is idle for a period of time.

7. The method of claim 1, wherein identifying identifies the edge device further comprises identifying the edge device when the network device receives a first packet of the request for the edge device over a control plane.

8. The method of claim 7, wherein the control plane is an Ethernet Virtual Private Network- Network Layer Reachability Information (EVPN-NLRI) Route-Type 2.

9. The method of claim 1, wherein the tenant network is a virtual local access network (VLAN) and the tenant is identified by a Media Access Control/Internet Protocol (MAC/IP) address.

10. The method of claim 1, wherein transmitting the configuration parameters to the edge device, further comprises:
transmitting, by the network device, the configuration parameters to a plurality of edge devices to provision each edge device of the plurality of edge devices for the tenant according to the configuration parameters.

11. The method of claim 1, further comprising:
initiating, by the network device, a default configuration for the edge device to broadcast each request in the communication network before identifying the edge device.

12. A network device, comprising:
one or more processors; and
at least one memory configured to store instructions, which when executed by the one or more processors, cause the one or more processors to perform the functions of:
identifying an edge device in a communication network based on an encapsulated workflow request received from the edge device identifying a tenant and a tenant network;
determining configuration parameters for the tenant and the tenant network from the request; and
transmitting the configuration parameters to the edge device to provision the edge device for the tenant according to the configuration parameters.

13. The network device of claim 12, wherein the execution of the instructions further cause the one or more processors to perform the function of:
importing the request from the edge device over a control plane in the communication network using an Ethernet Virtual Private Network (EVPN) protocol.

14. The network device of claim 12, wherein,
the request further identifies a trunk port for the edge device, and
the execution of the instructions further cause the one or more processors to perform the function of:
selecting the edge device from a plurality of edge devices in the communication network for provisioning to the tenant based on the trunk port for the edge device.

15. The network device of claim 12, wherein the execution of the instructions further cause the one or more processors to perform the function of:
updating a table stored in the at least one memory that maps provisioned edge devices for corresponding tenants.

16. The network device of claim 12, the execution of the instructions further cause the one or more processors to perform the function of:
monitoring data packets exchanged between a plurality of edge switches in the communication network for identifying the edge device.

17. The network device of claim 13, wherein,
the edge device is provisioned to service a plurality of workflows for the tenant, and
the execution of the instructions further cause the one or more processors to perform the function of:
withdrawing control plane routes in a Virtual Routing and Forwarding table from the edge device to release the edge device from provision when a traffic for each workflow service for a corresponding request is idle for a period of time.

18. The network device of claim 12, wherein the execution of the instructions further cause the one or more processors to identify the edge device when the network device receives a first packet of request for the edge device over a control plane.

19. A non-transitory computer-readable medium comprising computer-readable instructions, which when executed by one or more processors, cause the one or more processors to perform the functions of:
identifying, by a network device, an edge device in a communication network based on an encapsulated workflow request received from the edge device identifying a tenant and a tenant network;
determining configuration parameters for the tenant and the tenant network from the request; and
transmitting the configuration parameters to the edge device to provision the edge device for the tenant according to the configuration parameters.

20. The non-transitory computer-readable media of claim 19,
   wherein,
      the request further identifies a trunk port for the edge device, and
      the computer-readable instructions, when executed by the one or more processors, further cause the one or more processors to perform the function of:
         selecting the edge device from a plurality of edge devices in the communication network for provisioning to the tenant based on the trunk port for the edge device.

* * * * *